United States Patent [19]
Emanuele

[11] 3,880,250
[45] Apr. 29, 1975

[54] VEHICLES WITH INCREASED ENGINE EFFICIENCY

[75] Inventor: Emidio G. Emanuele, Niagara Falls, Ontario, Canada

[73] Assignee: The Raymond Lee Organization, Inc., New York, N.Y. ; a part interest

[22] Filed: Aug. 14, 1973

[21] Appl. No.: 388,142

[52] U.S. Cl.............. 180/65 R; 180/66 B; 60/413; 60/415; 60/DIG. 2
[51] Int. Cl............................................. B60k 1/00
[58] Field of Search .... 180/66 R, 66 B, 65 R, 65 A; 320/61, 62; 60/413, 415

[56] References Cited
UNITED STATES PATENTS

| | | | |
|---|---|---|---|
| 682,773 | 9/1901 | White | 180/66 B |
| 1,904,611 | 4/1933 | Boyette | 180/66 B |
| 3,379,008 | 4/1968 | Manganaro | 180/66 B |
| 3,530,356 | 9/1970 | Aronson | 180/65 R |
| 3,556,239 | 1/1971 | Spahn | 180/65 A |
| 3,688,859 | 9/1972 | Hudspeth et al. | 180/66 B |
| 3,704,760 | 12/1972 | Maruyama | 180/65 A |

Primary Examiner—Edgar W. Geoghegan
Assistant Examiner—Wm. F. Woods

[57] ABSTRACT

Air pumps actuated by rotating wheels of a vehicle force air under pressure into an accumulator. An electrically operated valve suitably controlled by manual switches releases air under pressure from the accumulator to rotate an air turbine, thus rotating a generator supplying power to a battery via a voltage regulator. Depression of the brake pedal engages a clutch disposed between the engine powered transmission and a compressor whereby the compressor is actuated and also supplies air under pressure to the accumulator.

1 Claim, 1 Drawing Figure

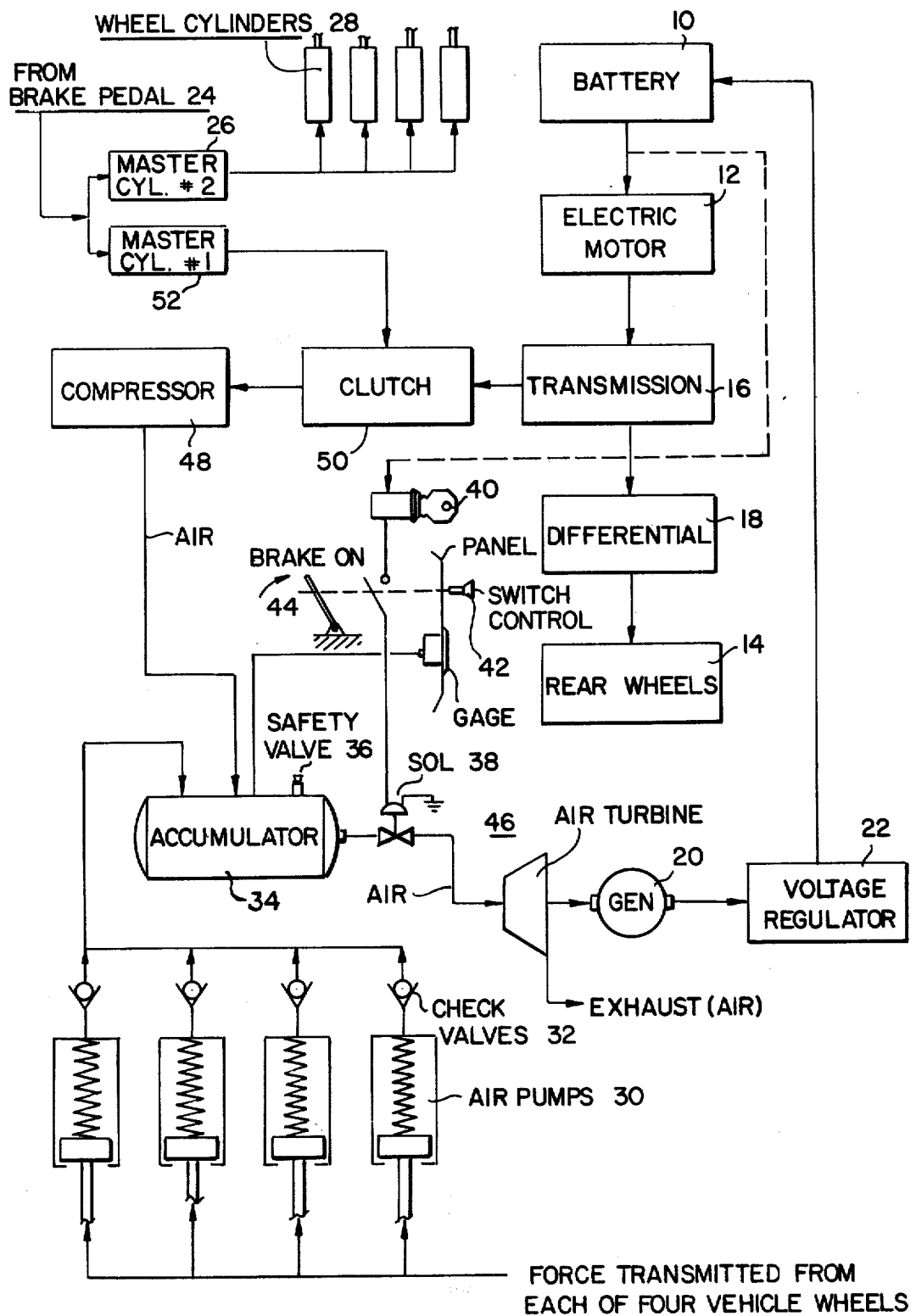

VEHICLES WITH INCREASED ENGINE EFFICIENCY

SUMMARY OF THE INVENTION

This invention is directed toward apparatus which can be incorporated into a wheeled vehicle using an electric or internal combustion engine to convert otherwise wasted energy into useful energy employed to charge the vehicular battery whereby engine efficiency is correspondingly increased.

To this end, a generator is used in conventional manner to charge the battery via a voltage regulator. The generator is powered by an air turbine. The turbine in turn is powered by compressed air released under control of the operator from an accumulator.

Air under pressure is fed from the atmosphere into the accumulator by use of air pumps operated by the rotating wheels of the vehicle. In addition, when the brake pedal is depressed, a clutch is engaged between the engine powered transmission and a normally inoperative compressor. The compressor then supplies additional compressed air to the accumulator.

BRIEF DESCRIPTION OF THE DRAWING

The accompanying FIGURE illustrates a preferred embodiment of my invention.

DETAILED DESCRIPTION OF PREFERRED EMBODIMENT

Referring now to the FIGURE, battery 10 supplies electric power to either electric motor 12 or a gasoline or diesel powered internal combustion engine. The engine drives rear wheels 14 through transmission 16 and differential 18 in conventional manner. The battery is charged via generator 20 and voltage regular 22 in conventional manner. Brake pedal 24 controls braking on all four wheels via master cylinder 26 and wheel cylinders 28 also in conventional manner.

However, each of the four wheels during rotation operates a separate air pump 30 forcing air from the atmosphere under pressure through one way check valves 32 into accumulator tank 34. Safety valve 36 releases air from the accumulator to the atmosphere when needed to prevent build up of dangerous excess pressure.

When solenoid valve 38 is opened by turning key switch 40 and operating either panel switch 42 or emergency brake switch 44 (these switches 42 and 44 are mechanically connected), thus causing power from the battery to actuate the valve 38, the air under pressure actuates turbine 46 to operate the generator and charge the battery.

Compressor 48 also supplies air to the accumulator when connected via clutch 50 to transmission 16. Normally the compressor is not so connected but when the pedal 24 is depressed, master cylinder 52 hydraulically actuates the clutch to connect transmission and compressor.

This normally wasted energy is used to charge the battery and fuel economy is substantially enhanced.

While I have described my invention with particular reference to the drawings, such is not to be considered as limiting its actual scope.

Having thus described this invention, what is asserted as new is:

1. Apparatus associated with an automotive drive system of a vehicle having at least four wheels to utilize energy normally wasted therein, said system including a battery charged via a voltage regulator by a generator, an electric motor coupled to the battery and supplying power to at least some of the wheels via a transmission and differential, said system further including a hydraulic braking system wherein a separate hydraulic cylinder is disposed on each wheel and wherein a brake pedal applies hydraulic pressure via a hydraulic master cylinder to the cylinders at the various wheels, said system comprising:

an air turbine connected to the generator;

an accumulator;

a normally closed solenoid operated valve connected between an output of the accumulator and an input of the air turbine, the valve when open passing air under pressure from the accumulator to the turbine, thus charging the battery;

first means including at least one switch connected in circuit between the battery and valve to enable the valve to be opened when desired by an operator;

second means responsive to specified vehicular motions to pass air under pressure into the accumulator, said second means including air pumps operated by wheel rotation to supply air to an input of the accumulator and a normally inoperative compressor which when operative supplies air to the accumulator input;

a normally disengaged clutch disposed between the compressor and the transmission, said clutch when engaged coupling the transmission to the compressor to cause the compressor to become operative; and means responsive to the depression of said pedal to cause said clutch to be engaged.

* * * * *